US012679619B2

(12) United States Patent
Mori et al.

(10) Patent No.: US 12,679,619 B2
(45) Date of Patent: Jul. 14, 2026

(54) PACKAGING BAG WITH SPOUT AND METHOD FOR PRODUCING PACKAGING BAG WITH SPOUT

(71) Applicant: Fujimori Kogyo Co., Ltd., Tokyo (JP)

(72) Inventors: Toshihiko Mori, Tokyo (JP); Hiroshi Kuwabara, Tokyo (JP); Naoto Fujikawa, Tokyo (JP)

(73) Assignee: ZACROS CORPORATION, Tokyo (JP)

( * ) Notice: Subject to any disclaimer, the term of this patent is extended or adjusted under 35 U.S.C. 154(b) by 294 days.

(21) Appl. No.: 18/033,284

(22) PCT Filed: Oct. 29, 2021

(86) PCT No.: PCT/JP2021/040068
§ 371 (c)(1),
(2) Date: Apr. 21, 2023

(87) PCT Pub. No.: WO2022/092276
PCT Pub. Date: May 5, 2022

(65) Prior Publication Data
US 2023/0391528 A1      Dec. 7, 2023

(30) Foreign Application Priority Data

Oct. 30, 2020     (JP) ................................. 2020-182338

(51) Int. Cl.
*B65D 75/00*          (2006.01)
*B29C 65/00*          (2006.01)
(Continued)

(52) U.S. Cl.
CPC .......... *B65D 75/5883* (2013.01); *B29C 65/18* (2013.01); *B29C 65/20* (2013.01);
(Continued)

(58) Field of Classification Search
CPC .............. B65D 75/5883; B65D 75/008; B65D 2207/00; B65D 2575/583; B29C 65/70;
(Continued)

(56) References Cited

U.S. PATENT DOCUMENTS 5,957,584 A * 9/1999 Lakey ................ B65D 75/5811
                                                    383/906
5,971,613 A * 10/1999 Bell ...................... B29C 66/229
                                                    383/906
(Continued)

FOREIGN PATENT DOCUMENTS

CN          102555296 A      7/2012
CN          106795999 A      5/2017
(Continued)

OTHER PUBLICATIONS

International Search Report for Application No. PCT/JP2021/040068 dated Jan. 18, 2022 with English Translation.
(Continued)

*Primary Examiner* — Frederick C Nicolas
(74) *Attorney, Agent, or Firm* — Harris Beach Murtha Cullina PLLC

(57) ABSTRACT

A packaging bag with a spout including a container main body accommodating a content, and a spout member for pouring out the content inside the container main body. The spout member has a base portion attached to the container main body, and a spout tube portion having a flow channel through which the content is poured out formed therein. The container main body is made using a polyethylene film. The spout member is a polyethylene molded body.

8 Claims, 3 Drawing Sheets

(51) Int. Cl.

| | |
|---|---|
| *B29C 65/18* | (2006.01) |
| *B29C 65/20* | (2006.01) |
| *B29C 65/70* | (2006.01) |
| *B29C 65/72* | (2006.01) |
| *B29L 31/00* | (2006.01) |
| *B31B 70/84* | (2017.01) |
| *B60P 7/00* | (2006.01) |
| *B65D 75/58* | (2006.01) |
| *B31B 160/20* | (2017.01) |

(52) U.S. Cl.

CPC .......... *B29C 65/2076* (2013.01); *B29C 65/72* (2013.01); *B29C 66/1122* (2013.01); *B29C 66/53263* (2013.01); *B29C 66/71* (2013.01); *B29C 66/723* (2013.01); *B29C 66/73713* (2013.01); *B29C 66/73921* (2013.01); *B29C 66/83221* (2013.01); *B29C 66/919* (2013.01); *B29C 66/949* (2013.01); *B31B 70/844* (2017.08); *B60P 7/00* (2013.01); *B65D 75/008* (2013.01); *B29C 65/70* (2013.01); *B29C 66/7352* (2013.01); *B29K 2023/06* (2013.01); *B29L 2031/7128* (2013.01); *B31B 2160/20* (2017.08); *B65D 2207/00* (2013.01); *B65D 2575/583* (2013.01)

(58) Field of Classification Search

CPC ..... B29C 66/7352; B29C 65/18; B29C 65/20; B29C 65/2076; B29C 65/72; B29C 66/1122; B29C 66/53263; B29C 66/71; B29C 66/723; B29C 66/73713; B29C 66/73921; B29C 66/83221; B29C 66/919; B29C 66/949; B29K 2023/06; B29K 2023/063; B29K 2023/065; B29L 2031/7128; B31B 70/844; B31B 2160/20; B60P 7/00

See application file for complete search history.

(56) References Cited

U.S. PATENT DOCUMENTS

| | | | | |
|---|---|---|---|---|
| 2003/0059130 A1* | 3/2003 | Yoneyama | ........... | B65D 75/008 383/906 |
| 2010/0172600 A1* | 7/2010 | Sherrill | ................ | B65D 75/008 493/267 |
| 2015/0284145 A1* | 10/2015 | Arimoto | .............. | B65D 75/008 383/42 |
| 2016/0340069 A1* | 11/2016 | Robinson | ............. | B65D 75/008 |
| 2017/0225852 A1* | 8/2017 | Ohkubo | ................. | B31B 70/18 |
| 2018/0105332 A1* | 4/2018 | Ohkubo | ............. | B65D 75/5883 |
| 2019/0256269 A1* | 8/2019 | Miura | ................ | B65D 75/5883 |

FOREIGN PATENT DOCUMENTS

| | | | |
|---|---|---|---|
| EP | 3305685 | A1 | 4/2018 |
| JP | 55047969 | U | 3/1980 |
| JP | 07002274 | A | 1/1995 |
| JP | 07016956 | A | 1/1995 |
| JP | 11091798 | A | 4/1999 |
| JP | 2006016063 | A | 1/2006 |
| JP | 2012120765 | A | 6/2012 |
| JP | 2012167172 | A | 9/2012 |
| JP | 2020157517 | A | 10/2020 |
| JP | 2020157729 | A | 10/2020 |

OTHER PUBLICATIONS

Office Action from Chinese Patent Office for Application No. 202180071831.6 dated Jun. 10, 2025 (translation provided).

European Search Report for Application No. 21886393.4 dated Sep. 4, 2024.

Office Action from Japanese Patent Office for Application No. 2022-559268 dated Jan. 20, 2026.

* cited by examiner

PACKAGING BAG WITH SPOUT AND METHOD FOR PRODUCING PACKAGING BAG WITH SPOUT

FIELD OF THE INVENTION

The present invention relates to a packaging bag with a spout and a method for producing a packaging bag with a spout.

BACKGROUND OF THE INVENTION

Standing pouches are widely used as refillable containers for shampoos, hair conditioners, and the like. Generally, a pouch main body of a standing pouch is constituted of a lamination film. A lamination film in which a plurality of raw materials having different characteristics are combined imparts various functions such as barrier properties and strength to a refillable container.

In recent years, from the viewpoint of effectively utilizing resources, it has been required to save petroleum resources by using recyclable materials. However, lamination films in which a plurality of raw materials are combined have a problem of being difficult to recycle because it takes time and effort to separate the raw materials. Regarding such a problem, containers using a film material of a single raw material (mono-material) as a material suitable for recycling are being studied.

For example, regarding recyclable resources, Japanese Unexamined Patent Application, First Publication No. 2012-167172 discloses a standing pouch in which a film using plant-derived polyethylene is adopted as a sealant film.

SUMMARY OF THE INVENTION

Technical Problem

It is required that standing pouches be able to be simply and quickly refilled with a content. For example, it is required that a spout be able to be simply opened by hand.

However, there is a problem in that it is difficult to cut and simply open a film material made using polyethylene, for example, as a single raw material by hand.

The present invention has been made in consideration of the foregoing circumstances, and an object thereof is to provide a packaging bag with a spout which is constituted using a film material of a single raw material, is easily opened, and is easily recycled, and a method for producing the packaging bag with a spout.

Solution to Problem

That is, the present invention employs the following constitutions.

[1] A packaging bag provided with a spout including a container main body accommodating a content, and a spout member for pouring out the content inside the container main body. The spout member has a base portion attached to the container main body, and a spout tube portion having a flow channel through which the content is poured out formed therein. The container main body is made using a polyethylene film. The spout member is a polyethylene molded body.

[2] In the packaging bag with a spout according to [1], the polyethylene film is made using a stretched polyethylene layer and an unstretched polyethylene layer.

[3] In the packaging bag with a spout according to [1] or [2], the packaging bag is a standing pouch.

[4] A method for producing a packaging bag with a spout including a container main body accommodating a content, and a spout member for pouring out the content inside the container main body. The spout member has a base portion attached to the container main body, and a spout tube portion having a flow channel through which the content is poured out formed therein. The container main body is made using a polyethylene film. The spout member is a polyethylene molded body. The method includes a step of heating only a surface of the base portion in a circumferential direction to a temperature equal to or higher than a melting point of the polyethylene by bringing a heated mold into contact with a side surface of the base portion, and a step of heat sealing using a mold by inserting the heated base portion into the container main body.

[5] In the method for producing a packaging bag with a spout according to [4], the step of heating is a step in which a temperature on a surface of the mold that comes into contact with the side surface of the base portion is set to 130° C. to 230° C. and the mold is brought into contact with the side surface of the base portion for 0.5 seconds to 3.0 seconds.

[6] In the method for producing a packaging bag with a spout according to [4] or [5], a surface of the mold that comes into contact with the side surface of the base portion is subjected to mold release processing.

[7] In the method for producing a packaging bag with a spout according to any one of [4] to [6], a surface of the mold that comes into contact with the side surface of the base portion has a three-dimensional shape. The step of heating is a step in which the three-dimensional shape is transferred to the side surface of the base portion.

Advantageous Effects of Invention

According to the present invention, it is possible to provide a packaging bag with a spout which is constituted using a film material of a single raw material, is easily opened, and is easily recycled, and a method for producing the packaging bag with a spout.

DETAILED DESCRIPTION OF THE INVENTION

Hereinafter, an embodiment of the present invention will be described with reference to the drawings. In each of the drawings used in the following description, the scale of each member may be suitably changed in order to make each member have a recognizable size.

Figure 1:
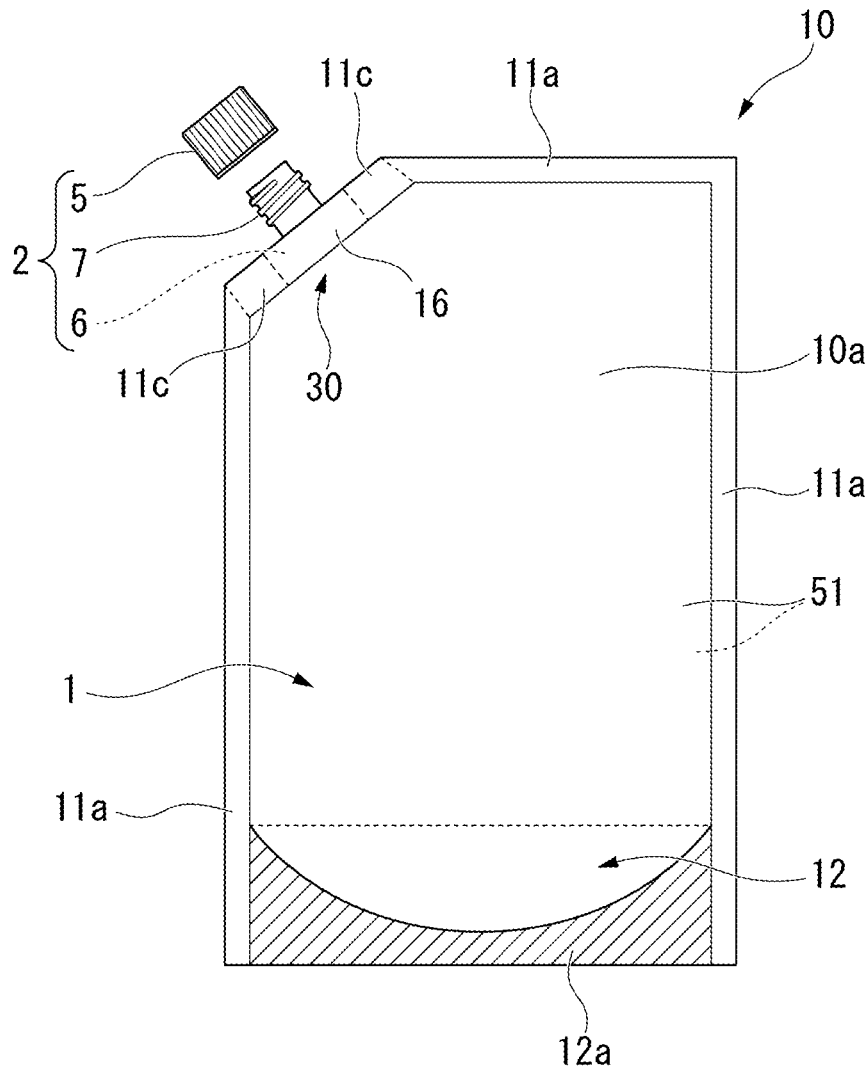
FIG. 1 is a schematic view illustrating an example of a packaging bag with a spout of the present embodiment.

FIG. 1 is a general view of a packaging bag 10 with a spout.

Figure 2:
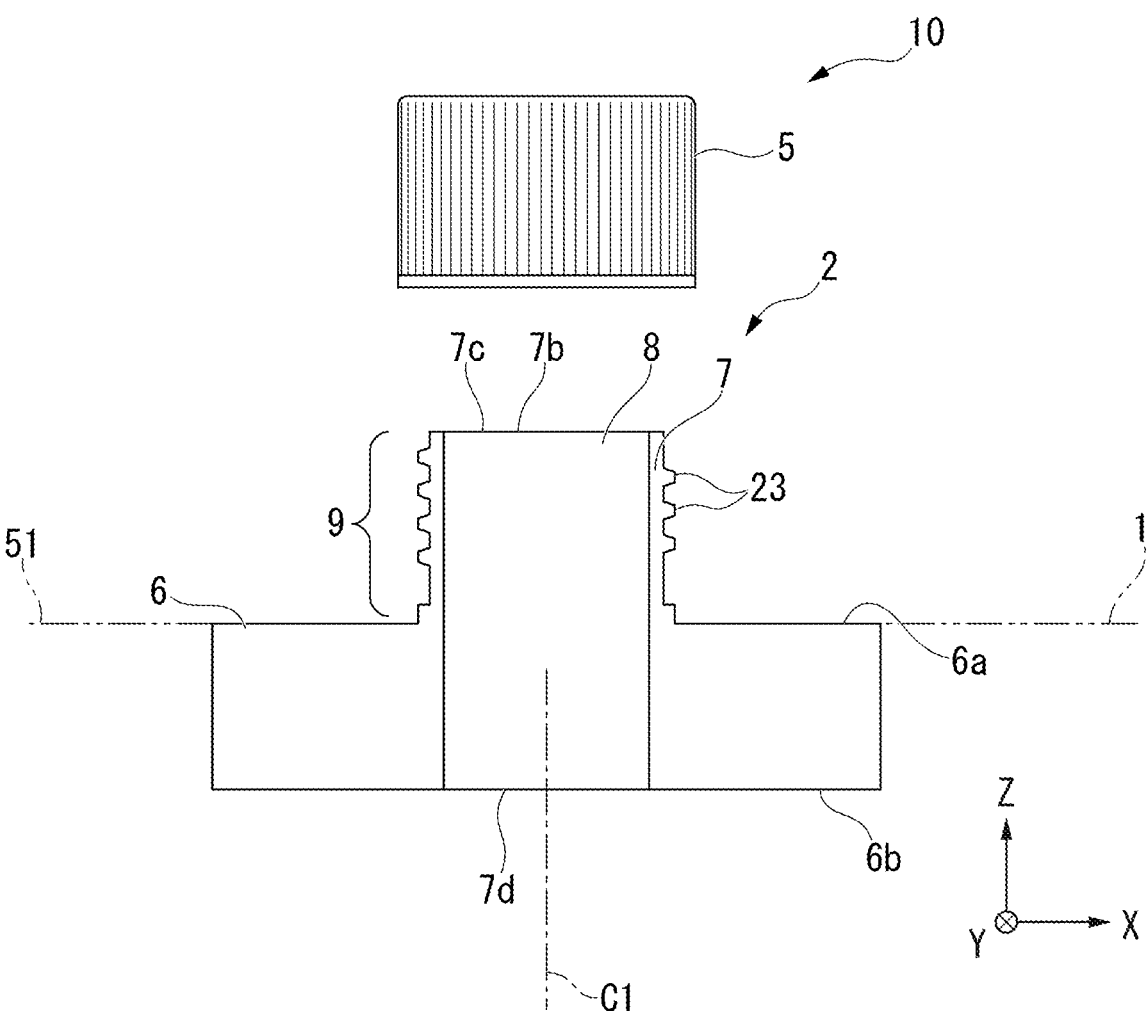
FIG. 2 is a cross-sectional view of a part of the packaging bag with a spout of the present embodiment.
Figure 3:
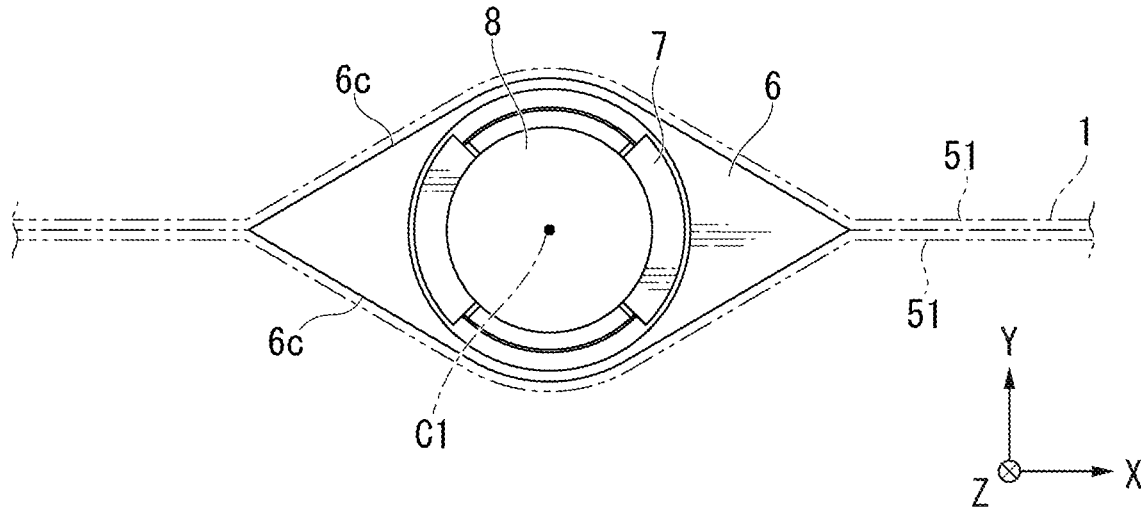
FIG. 3 is a plan view of a base portion and a spout tube portion of a spout member.

FIG. 2 illustrates a cross-sectional view of a part of the packaging bag 10 with a spout of the embodiment. FIG. 2 is a plan view of a base portion 6 and a spout tube portion 7 of a spout member 2. FIG. 3 is a plan view of the base portion 6 and the spout tube portion 7 of the spout member 2.

As illustrated in FIG. 1, the packaging bag 10 with a spout (which will hereinafter be simply referred to as a packaging bag 10) of the embodiment includes a container main body 1 and the spout member 2. For example, the container main body 1 is a standing pouch constituted of two body portion films 51 and 51 having the same planar shape as each other, and a bottom portion film 12.

The container main body 1 includes an inclined portion 30 in one corner portion of a part which becomes an upper portion when the container main body 1 is caused to stand by itself while having the bottom portion film 12 side as a bottom portion.

The body portion films 51 and 51 and the bottom portion film 12 are integrally formed by heat-sealing circumferential edge portions thereof. For example, the packaging bag 10 has side end seal portions 11a and a bottom portion seal portion 12a. The side end seal portions 11a are formed by sealing side end portions on both sides of the body portion films 51 and 51. The bottom portion seal portion 12a is formed by sealing the body portion films 51 and 51 and the bottom portion film 12. The bottom portion film 12 is interposed between the body portion films 51 and 51.

An accommodation portion 10a of the packaging bag 10 can be filled with a content. The packaging bag 10 in which the inside of the accommodation portion 10a is filled with a content can stand by itself in a state in which the bottom portion film 12 is facing downward (upright state). The content is not particularly limited and may be liquid matter, solid matter such as powder or granules, viscous matter, liquid, a mixture thereof, or the like.

A film used as the body portion films 51 and the bottom portion film 12 is made using a polyethylene film. It is preferable that a polyethylene film be made using a stretched polyethylene layer and an unstretched polyethylene layer.

The unstretched polyethylene layer becomes a heat sealing layer. The container main body 1 has the unstretched polyethylene layer on the content side.

A thickness of the unstretched polyethylene layer is 60 μm to 180 μm, for example.

The stretched polyethylene layer becomes an outermost layer on a side opposite to the side that comes into contact with a content, and a product name, decoration, or the like may be printed thereon.

It is preferable that the stretched polyethylene layer be a biaxially stretched polyethylene.

A thickness of the stretched polyethylene layer is 10 μm to 50 μm, for example.

A polyethylene material for forming a polyethylene film may be constituted of only one kind of polyethylene, or two or more kinds of polyethylene may be used together. Two or more kinds of polyethylene are, for example, two or more kinds of polyethylene having different grades.

Regarding a polyethylene material for forming a polyethylene film, a high-density polyethylene or a medium-density polyethylene having a density of 0.926 g/cm³ or higher, or a low-density polyethylene or a linear low-density polyethylene having a density of 0.925 g/cm³ or lower can be used.

In the present embodiment, it is preferable to use a high-density polyethylene as a material for forming the stretched polyethylene layer, and it is preferable to use a low-density polyethylene as a material for forming the unstretched polyethylene layer.

A polyethylene film can be produced by coextruding a film material for forming the stretched polyethylene layer and a film material for forming the unstretched polyethylene layer.

As illustrated in FIG. 1, the spout member 2 is provided in the inclined portion 30.

The spout member 2 includes the base portion 6, the spout tube portion 7, and a cap 5.

As illustrated in FIG. 3, the base portion 6 is attached to the container main body 1 in a state of being sandwiched between the body portion films 51 and 51. Side surfaces 6c and 6c on one side and the other side of the base portion 6 are respectively heat-sealed onto inner surfaces of the body portion films 51 and 51.

The spout tube portion 7 has a cylindrical shape. A part (an upper portion in FIG. 2) of the spout tube portion 7 protrudes in a Z direction (upward in FIG. 2) from a first end surface 6a (an upper surface in FIG. 2) of the base portion 6. A part in which the spout tube portion 7 protrudes from the first end surface 6a will be referred to as a protrusion part 9. In FIG. 2, the reference sign 6b indicates a second end surface of the base portion 6.

As illustrated in FIG. 3, a planar shape (a shape viewed in the Z direction) of a flow channel 8 that is an internal space of the spout tube portion 7 is a circular shape, for example. As illustrated in FIG. 2, through the flow channel 8, a content in the container main body 1 can be poured out from a spout 7b that is an opening on a tip 7c side of the spout tube portion 7. A screw portion 23 is formed on an outer circumferential surface of the protrusion part 9 of the spout tube portion 7. The reference sign 7d indicates a base end of the spout tube portion 7. The reference sign Cl indicates a central axis of the spout tube portion 7.

The base portion 6, the cap 5, and the spout tube portion 7 are polyethylene molded bodies.

The base portion 6, the spout tube portion 7, and the cap 5 can be manufactured by injection molding or the like.

The spout tube portion 7 may be manufactured using a 3D printer. The degree of freedom in design of the spout tube portion 7 can be enhanced by using a 3D printer.

The present invention is not limited to the embodiment described above, and various modifications can be made within a range not departing from the gist of the present invention.

The packaging bag 10 illustrated in FIG. 1 is a standing pouch. However, the form of a pouch that can be applied to the packaging bag of the present embodiment is not particularly limited to this, and various forms such as a three-sided seal bag, a four-sided seal bag, or a gusset bag can be employed. Among these, it is preferable that the packaging bag 10 be a standing pouch.

<Method for Producing Packaging Bag with Spout>

The present embodiment is a method for producing a packaging bag with a spout including a container main body accommodating a content, and a spout member for pouring out a content inside the container main body.

First, in order to produce the container main body 1, the side end seal portions 11a and the bottom portion seal portion 12a are formed by heat-sealing a set of body portion films 51 and the bottom portion film 12.

Figure 4A:
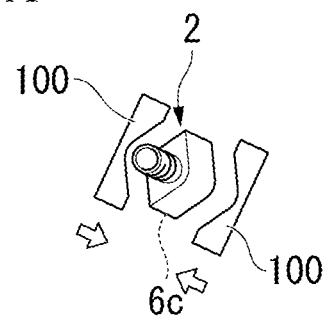
FIG. 4 is an explanatory schematic view of a method for producing a packaging bag with a spout of the present embodiment.

Only a surface of the base portion 6 in a circumferential direction is heated to a temperature equal to or higher than a melting point of polyethylene by bringing a heated mold 100 into contact with the side surfaces 6c of the base portion 6 of the spout member 2 illustrated in FIG. 4(a).

Specifically, it is preferable that the temperature on surfaces of the mold that come into contact with the side surfaces 6c of the base portion 6 be set to 130° C. to 230° C. and the mold be brought into contact with the side surfaces 6c of the base portion 6 for 0.5 seconds to 3.0 seconds.

Through this step, only the polyethylene on the surface of the base portion 6 in the circumferential direction melts.

Figure 4B:
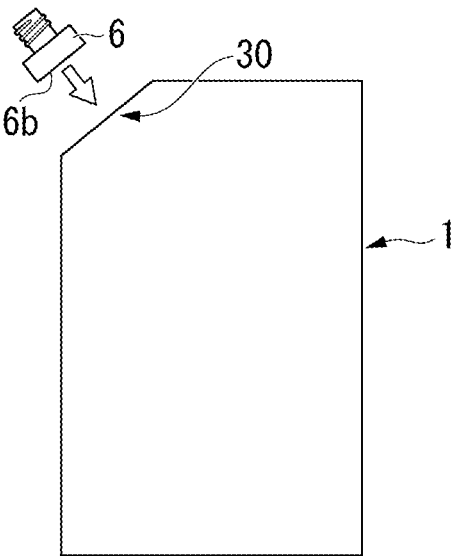

Next, as illustrated in FIG. 4(b), the base portion 6 in which only the polyethylene on the surface in the circumferential direction has melted is inserted into the container main body 1. At this time, the base portion 6 is inserted into the container main body 1 such that the second end surface 6b of the base portion 6 and the inclined portion 30 of the container main body 1 become parallel to each other.

Figure 4C:
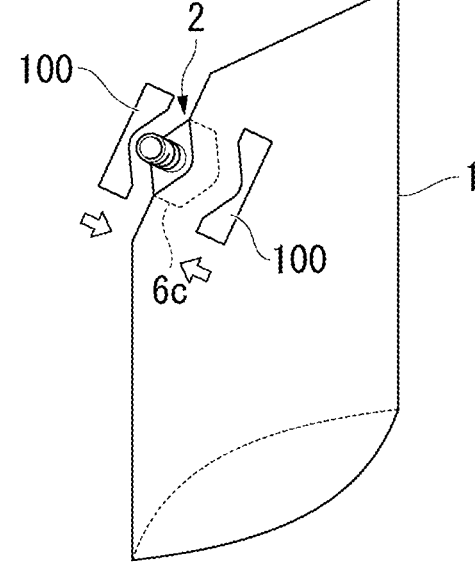

After insertion, as illustrated in FIG. 4(c), in a state of having the base portion 6 sandwiched between the set of body portion films 51, the side surfaces 6c of the base portion 6 and the body portion films 51 are heat-sealed using the mold 100. Accordingly, heat sealing portions 11c and the joint portions 16 illustrated in FIG. 1 are formed. The heat sealing portions 11c are parts in which the body portion films 51 are heat-sealed with each other. The joint portions 16 are parts in which the body portion films 51 and the base portion 6 are heat-sealed in a state of having the base portion 6 sandwiched between the body portion films 51.

In the present embodiment, it is preferable that the temperature on surfaces of the mold that come into contact with the base portion 6 and the heat sealing portions 11c be set to 120° C. to 220° C. and the mold be brought into contact with the base portion 6 and the heat sealing portions 11c for 0.4 seconds to 3.0 seconds.

In the related art, a polyethylene terephthalate film (PET film) is used for a surface layer of a film constituting the container main body 1. Since the melting point of polyethylene terephthalate is 200° C. or higher, even if it is heated at a high temperature during heat sealing, it can be heat-sealed with the base portion without melting a PET film on the surface.

On the other hand, in the packaging bag with a spout of the present embodiment, the container main body 1 is made using a polyethylene film. Since the melting point of a polyethylene film is low, that is, 140° C. or lower, it is difficult to heat-seal the spout member without melting the polyethylene film.

Regarding such a problem, the spout member can be heat-sealed without melting the polyethylene film by bringing the base portion 6 of the spout member 2 into contact with the mold.

In the present embodiment, a polyethylene is used as a material for forming both the body portion films 51 and the base portion 6. Polyethylenes are similar to each other in softening tendency and melting tendency due to heating. For this reason, the degree of softening, melting, and mixing for heat sealing is likely to proceed, and a firmer heat-sealed state is likely to be formed after cooling.

For this reason, in addition to favorable heat sealing of 11a, 12a, and 11c that are heat sealing portions between body portion films, firm heat sealing can also be realized in the joint portions 16 between the container main body 1 and the spout member 2.

It is preferable that surfaces of the mold that come into contact with the side surfaces 6c of the base portion 6 be subjected to mold release processing. Regarding an example of mold release processing, pasting of a Teflon (registered trademark) tape or a fluororesin-based coating is preferably adopted.

It is preferable that the surfaces of the mold that come into contact with the side surfaces 6c of the base portion 6 have a three-dimensional shape. Examples of a three-dimensional shape include a fine uneven shape.

By using such a mold, in the step of heating, a three-dimensional shape can be transferred to the side surfaces 6c of the base portion 6.

Since the packaging bag of the present invention is provided with a spout member, it is easily opened, and since it is constituted using a film material of a single raw material, it is easily recycled.

REFERENCE SIGNS LIST

1 Container main body
2 Spout member
5 Cap
6 Base portion
6a First end surface
6b Second end surface
6c Side surface
7 Spout tube portion
7b Spout
7c Tip
8 Flow channel
9 Protrusion part
10 Packaging bag
10a Accommodation portion
11a Side end seal portion
11c Heat sealing portion
12 Bottom portion film
12a Bottom portion seal portion
16 Joint portion
23 Screw portion
30 Inclined portion
51 Body portion film
100 Mold

The invention claimed is:

1. A method for producing a packaging bag with a spout including a container main body accommodating a content, and a spout member for pouring out the content inside the container main body, wherein the spout member has a base portion attached to the container main body, and a spout tube portion having a flow channel through which the content is poured out formed therein, wherein the container main body is made using a polyethylene film, wherein the spout member is a polyethylene molded body, and wherein the method comprises:

a step of heating only a surface of the base portion in a circumferential direction to a temperature equal to or higher than a melting point of the polyethylene by bringing a heated mold into contact with a side surface of the base portion, and a step of heat sealing side surfaces of the base portion and the container main body by bringing a mold with a surface temperature set between 120° C. and 220° C. into contact with the base portion and the container main body in a state of inserting the heated base portion into the container main body.

2. The method for producing the packaging bag with the spout according to claim 1, wherein the step of heating is a step in which the surface temperature of the mold that comes into contact with the side surface of the base portion is set to 130° C. to 230° C. and the mold is brought into contact with the side surface of the base portion for 0.5 seconds to 3.0 seconds.

3. The method for producing the packaging bag with the spout according to claim 1, wherein a surface of the mold that comes into contact with the side surface of the base portion is subjected to mold release processing.

4. The method for producing the packaging bag with the spout according to claim 1, wherein a surface of the mold that comes into contact with the side surface of the base portion has a three-dimensional shape, and wherein the step of heating is a step in which the three-dimensional shape is transferred to the side surface of the base portion.

5. The packaging bag with the spout, which is produced by the method according to claim 1.

6. The packaging bag with the spout according to claim 5, wherein the polyethylene film is made using a stretched polyethylene layer and an unstretched polyethylene layer.

7. The packaging bag with the spout according to claim 5, wherein the packaging bag is a standing pouch.

8. The method for producing the packaging bag with the spout according to claim 1, wherein the step of heat sealing is performed immediately after the step of heating without any intervening step.

\* \* \* \* \*